United States Patent [19]

Schulz et al.

[11] Patent Number: 5,073,592

[45] Date of Patent: Dec. 17, 1991

[54] PROCESS FOR THE PREPARATION OF A RUBBER HAVING POLYMER BOUND FUNCTIONALITY

[75] Inventors: Gerald O. Schulz, Stow; Dane K. Parker, Massillon, both of Ohio

[73] Assignee: The Goodyear Tire & Rubber Company, Akron, Ohio

[21] Appl. No.: 562,052

[22] Filed: Aug. 2, 1990

[51] Int. Cl.$^5$ .............................................. C08K 5/36
[52] U.S. Cl. .................................. 524/750; 526/214; 524/742
[58] Field of Search .................. 524/742, 750; 526/214

[56] References Cited

U.S. PATENT DOCUMENTS 4,521,574 6/1985 Patterson et al. .................... 526/307

*Primary Examiner*—Joseph L. Schofer
*Assistant Examiner*—Mark Sweet
*Attorney, Agent, or Firm*—Bruce J. Hendricks

[57] ABSTRACT

The present invention relates to a process for preparing a rubber containing polymer bound antidegradants. The process comprises the aqueous emulsion polymerization of (a) at least one functionalized monomer that contains an antidegradant moiety and a polymerizable vinyl group; with (b) at least one copolymerizable conjugated diene monomer, wherein the polymerization is conducted in the presence of from about 1 to about 70 parts by weight of an ester based on 100 parts by weight of total monomers. The ester functions as a synergist for the antidegradant, as a cosolvent/dispersing agent for the antidegradant during emulsion polymerization and as a plasticizer for the final polymer product.

13 Claims, No Drawings

PROCESS FOR THE PREPARATION OF A RUBBER HAVING POLYMER BOUND FUNCTIONALITY

BACKGROUND OF THE INVENTION

The present invention relates to a process for preparing a rubber containing polymer bound antidegradants. More specifically, the present invention relates to a process for forming a rubber comprising the aqueous emulsion polymerization of (a) at least one functionalized monomer that contains an antidegradant moiety and a polymerizable vinyl group with (b) at least one copolymerizable conjugated diene monomer, wherein the polymerization is conducted in the presence of an ester that functions as a synergist for the antidegradant, as a cosolvent/dispersing agent for the antidegradant during emulsion polymerization and as a plasticizer for the final polymer product.

Polymer bound antidegradants have been used in masterbatch rubber. The masterbatch rubber is blended down to the desired level with the rubber in which the antidegradant is intended to function. One route to prepare the masterbatch rubber involves the use of copolymerizable functionalized monomers. Many of these copolymerizable monomers are polar, high melting solids which are only slightly soluble in the copolymerizable diene monomers typically employed to prepare rubber. The solubility of these chemicals limits the level to which they can be polymerized and thus the extent to which they may be utilized in the masterbatch blending technique.

U.S. Pat. Nos. 3,658,769, 3,767,628 and 4,213,892 describe the preparation of compounds such as N-(4-anilinophenyl) methacrylamide and N-(4-anilinophenyl) acrylamide and the polymerization of such compounds with typical monomers. These references suggest that a solvent such as methylethyl ketone or isopropyl alcohol may be required to obtain adequate solubility of the monomers as well as to solubilize other ingredients. Unfortunately, the use of cosolvents like methylethylketone (MEK) and isopropyl alcohol is limited in emulsion polymerization systems due to the tendency of these solvents to destabilize latex particles resulting in partial coagulation or the formation of multiple phases.

U.S. Pat. No. 4,521,574 discloses the use of dichloromethane (DCM) and/or tetrahydrofuran (THF) as cosolvents in an emulsion polymerization; however, DCM and THF have been determined to be a potential environmental and health concern.

U.S. Pat. No. 4,701,507 discloses the use of methyl isobutyl ketone (MIBK) as a cosolvent in an emulsion polymerization; however, MIBK is also unsuitable in many applications due to its odor and volatile nature. In addition, the use of a solubilizing cosolvent while necessary to dissolve polar, solid copolymerizable monomers in the emulsion polymerization recipe, most often will require its complete removal and economical recycle upon completion of the reaction. These steps of cosolvent addition, removal and recycle make their use inconvenient and costly.

U.S. Pat. Nos. 4,125,515, 4,241,217 and 4,301,296 disclose that esters such as 3,6,9-trioxyundecane-1,11-bis(3-n-dodecylthiopropionate) function as synergists when combined with polymer bound antioxidants. Examples of polymer bound antioxidants include N-(4-anilinophenyl) methacrylamide.

U.S. Pat. No. 4,216,116 discloses that esters such as 3,6,9-trixoyundecane-1,11-bis(3-n-dodecylthiopropionate) function as synergists with polymer bound phenolic antioxidants. Examples of phenolic antioxidants include the butylated reaction product of p-cresol and dicyclopentadiene.

SUMMARY OF THE INVENTION

The present invention relates to a process for forming an improved rubber. The process comprises the aqueous emulsion polymerization of (a) at least one functionalized monomer that contains an antidegradant moiety and a polymerizable vinyl group; with (b) at least one copolymerizable conjugated diene monomer, wherein the polymerization is conducted in the presence of from about 1 to about 70 parts by weight of an ester based on 100 parts by weight of total monomers.

DETAILED DESCRIPTION OF THE INVENTION

There is disclosed a process for forming a rubber comprising the aqueous emulsion polymerization of:
(a) at least one functionalized monomer that contains an antidegradant moiety and a polymerizable vinyl group; with
(b) at least one copolymerizable conjugated diene monomer selected from the group consisting of butadiene-1,3, 2-chlorobutadiene-1,3, isoprene, piperylene and conjugated hexadienes;
wherein the polymerization is conducted in the presence of from about 1 to about 70 parts by weight of an ester based on 100 parts by weight of total monomers; said ester having the following structural formula:

$$(R^2-S-CH_2-CH(R)-\overset{O}{\underset{\|}{C}}-O)_n R^1 \qquad (I)$$

wherein n is an integer from 1 to 4, wherein R is selected from the group consisting of hydrogen and methyl, wherein when n is 1, $R^1$ is selected from the group consisting of alkyl radicals having from 1 to 18 carbon atoms, aryl radicals having from 6 to 12 carbon atoms, aralkyl radicals having from 7 to 12 carbon atoms and cycloalkyl radicals having from 5 to 12 carbon atoms wherein when n is 2, $R^1$ is selected from the group consisting of alkylene radicals having from 2 to 18 carbon atoms, cycloalkylene radicals having from 5 to 12 carbon atoms, arylene radicals having from 6 to 12 carbon atoms,

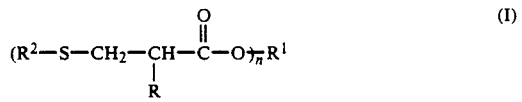

polyalkyl glycol ether radicals having the following structure:

$$-(CH_2-CH_2-O)_x CH_2-CH_2-$$

wherein x is an integer from 1 to 7, a thioether radical having the following structure:

$$-CH_2-CH_2-S-CH_2-CH_2-$$

wherein when n is 3 or 4, $R^1$ is an aliphatic hydrocarbon radical having the formula $C_yH_{2y+2-n}$, wherein y is an integer from 3 to 6 and wherein $R^2$ is selected from the group consisting of alkyl radicals having from 1 to 24 carbon atoms, aryl radicals having from 6 to 12 carbon atoms and aralkyl radicals having from 7 to 12 carbon atoms.

With respect to formula I, preferably n is 2 and R is $CH_3$, $R^1$ is 3,6,9-trioxaundecyl, and $R^2$ is n-dodecyl. Esters which may be used in the process of the present invention include 3,6,9-trioxaundecane-1,11-bis(3-n-dodecylthiopropionate),
3,6-dioxaoctane-1,8-bis(3-n-dodecylthiopropionate),
3,6,9-trixoaundecane-1,11-bis(3-n-dodecylthio-2-methylpropionate),
3-oxapentane-1,5-bis-(3-n-dodecylthiopropionate),
phenyl-(3-phenylthio-propionate),
phenyl-1,4-bis(3-t-dodecylthiopropionate),
naphthyl-1-(3-n-dodecylthiopropionate),
naphthyl-2-(3-n-octyl-2-methylpropionate),
naphthyl-1,4-bis(3-n-hexylthiopropionate),
phenyl-(3-n-dodecylthio-2-methylpropionate),
benzyl-(3-t-dodecylthiopropionate),
benzyl-(3-n-dodecylthio-2-methylpropionate),
p-xyxyl-alpha, alpha'-bis(3-n-octyl-2-methylpropionate),
o-xyxyl-alpha, alpha'-bis(3-n-dodecylthiopropionate),
ethane-1,2-bis(3-n-dodecylthiopropionate),
ethane-1,2-bis(3-t-dodecylthiopropionate),
butane-1,4-bis(3-benzylthiopropionate),
pentane-1,5-bis(3-n-hexylthio-2-methylpropionate),
propane-1,2-bis(3-n-dodecylthiopropionate),
octane-1,8-bis(3-n-tetracosylthiopropionate),
3,6,9-trioxaundecane-1,11-bis(3-phenylthiopropionate),
3,6,9-trioxaundecane-1,11-bis(3-berzylthio-2-methylpropionate),
3-oxapentane-1,5-bis(3-benzylthio-2-methylpropionate),
3-thiapentane-1,5-bis(n-octylthio-2-methylpropionate),
3-thiapentane-1,5-bis(benzylthio-2-methylpropionate), 1,1,1-trimethanolpropane-tris(3-n-octylthiopropionate), 1,1,1-trimethanolpropane-bis(3-t-dodecylthiopropionate), pentaerythritol-tetrakis(3-phenylthiopropionate), pentaerythritol-tetrakis(3-n-dodecylthio-2-methyl-propionate). The preferred esters are 3,6,9-trioxaundecane-1,11-bis(3-n-dodecylthiopropionate) and 3,6-dioxaoctane-1,8-bis(3-n-dodecylthiopropionate).

The above esters are illustrated in U.S. Pat. Nos. 3,629,194 and 3,758,549 which are incorporated herein by reference in their entirety.

The esters which may be used in the process of the present invention can be prepared by reacting a suitable thiol with an ester of acrylic or methacrylic acid in the presence of a basic catalyst such as KOH or benzyl trimethyl ammonium hydroxide. In the case of aromatic hydroxy compounds such a process is preferred. The esters may also be conveniently prepared by reacting a suitable acid with an alcohol in a known simple acid catalyzed esterification procedure as described in U.S. Pat. No. 2,601,063.

The above esters may also be prepared by the initial reaction of a suitable thiol with a lower alkyl ester of acrylic or methacrylic acid. The product of alkylthiopropionate ester is then transesterified with a high molecular weight glycol.

The above esters serve a multifunctional role as a solvent and dispersing agent in the polymerization, and as a plasticizer and antioxidant synergist in the coagulated isolated rubber or rubber blends. The level of ester for use in the present invention may vary. Generally speaking, the level of ester, may range from about 1 to 70 parts by weight of ester per 100 parts by weight of total monomer. In those instances where one desires to prepare a rubber compound which is not going to be used as a masterbatch, a range of from about 2 to 10 parts by weight of ester is preferred, and a range of from about 2 to 5 parts by weight is particularly preferred. In those instances where one desires to prepare a masterbatch compound, a range of from 10 to 50 parts by weight of ester is preferred and a range of from 20 to 40 parts by weight is particularly preferred.

Conventional emulsion recipes are employed with the present invention, however, some restrictions and modifications arise either from the cosolvent, the copolymerizable antidegradant itself, or the polymerization parameters. Ionic surfactants, known in the art, including sulfonate detergents and carboxylate soaps are useful in the instant invention. The level of ionic surfactant is computed based upon the total of the organic components (monomers plus cosolvents) and ranges from 2 to 30 parts by weight of ionic surfactant per 100 parts by weight of organic components with 4-25 parts being more preferred and 5-12 parts being most preferred. Those skilled in the art will appreciate that these levels are higher than usually used.

Free radical initiators known in the art are useful in the instant invention, however, initiators which are strong oxidizing agents, such as persulfate systems, cannot be used with certain functionalized monomers, i.e., those functionalized monomers that contain moieties which are readily oxidizable. One example of such a functionalized monomer is N-(4-anilinophenyl) methacrylamide.

Both hot polymerization recipes, 40° to 100° C., and cold polymerization recipes, 0° to 25° C., may be used, however, the hot recipes are preferred. Preferably the polymerization is carried out to complete monomer conversion in order to incorporate essentially all of the copolymerizable antidegradant. Incremental addition, or the use of high levels of a chain transfer agent may be necessary in order to avoid excessive gel formation. Incremental addition of the comonomer(s) may be necessary for complete incorporation of the copolymerizable antidegradant. Such minor modifications are within the skill of the artisan.

When a cold emulsion recipe is used, the functionalized monomer is preferably dissolved in the ester while heating. The temperature of the solution may range from about 50° C. to about 90° C. The preferred temperature ranges from about 60° C. to 80° C. The hot solution is then mixed with hot aqueous surfactant solution under shear agitation to form a stable emulsion. The emulsion is charged as the initial soap solution in the cold emulsion recipe. Therefore, according to this preferred embodiment, when a cold recipe is used, the functionalized monomer is combined with the ester prior to being charged to the emulsion recipe containing the conjugated diene monomer.

Examples of functionalized monomers that contains an antidegradant moiety and a polymerizable vinyl group are amides having the structural formula:

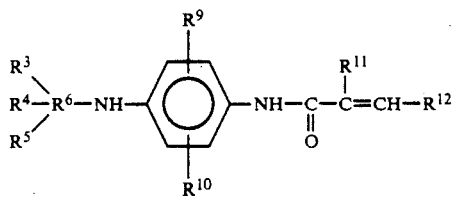

(II)

wherein $R^6$ is an aryl radical, $R^3$ and $R^4$ are selected from the group consisting of hydrogen, alkyl radicals having from 1 to 4 carbon atoms and alkoxy radicals having from 1 to 4 carbon atoms, $R^5$ is selected from the group consisting of hydrogen, alkyl radicals having from 1 to 4 carbon atoms, alkoxy radicals having from 1 to 4 carbon atoms and a radical having the following structural formula:

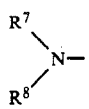

wherein $R^7$ is selected from the group consisting of alkyl radicals having from 1 to 12 carbon atoms, cycloalkyl radicals having from 5 to 12 carbon atoms, aryl radicals having from 6 to 12 carbon atoms and aralkyl radicals having from 7 to 13 carbon atoms and $R^8$ is selected from the group consisting of hydrogen and alkyl radicals having from 1 to 12 carbon atoms and wherein $R^9$ and $R^{10}$ are hydrogen or alkyl radicals having from 1 to 4 carbon atoms, $R^{11}$ is selected from the group consisting of hydrogen, methyl and ethyl; and $R^{12}$ is hydrogen or phenyl. Preferably $R^3$ is hydrogen, $R^4$ is hydrogen, $R^5$ is hydrogen, $R^6$ is an aryl radical having 6 carbon atoms, $R^9$ is hydrogen, $R^{10}$ is hydrogen, $R^{11}$ is hydrogen or an alkyl having 1 carbon atom and $R^{12}$ is hydrogen.

Other examples of functionalized monomers that contain an antidegradant moiety and a polymerizable vinyl group include imides selected from the group consisting of (1) compounds having the following structural formula:

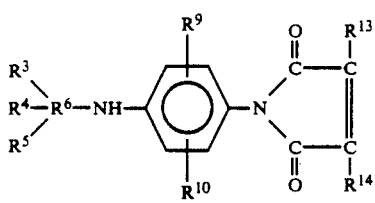

(III)

wherein $R^3$, $R^4$, $R^5$, $R^9$ and $R^{10}$ are as previously defined herein under structural formula II and wherein $R^{13}$ and $R^{14}$ are selected from the group consisting of hydrogen and alkyl radicals having from 1 to 14 carbon atoms and (2) compounds having the following structural formula:

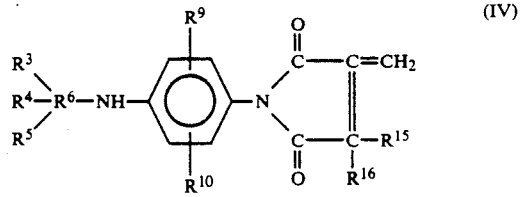

(IV)

wherein $R^3$, $R^4$, $R^5$, $R^6$, $R^9$ and $R^{10}$ are as previously defined herein under structural formula I and wherein $R^{15}$ and $R^{16}$ are selected from the group consisting of hydrogen and alkyl radicals having from 1 to 4 carbon atoms. Preferably, $R^3$ is hydrogen, $R^4$ is hydrogen, $R^5$ is hydrogen, $R^6$ is an aryl having 6 carbon atoms, $R^9$ is hydrogen, $R^{10}$ is hydrogen, $R^{13}$ is hydrogen, $R^{14}$ is hydrogen, $R^{15}$ is hydrogen, and $R^{16}$ is hydrogen.

Additional examples of functionalized monomers that contain an antidegradant moiety and a polymerizable vinyl group include phenols of the structural formula:

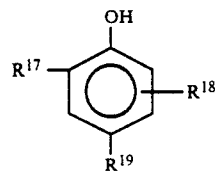

(V)

wherein $R^{17}$ and $R^{18}$ is a tert-alkyl radical having from 4 to 8 carbon atoms, $R^{19}$ is selected from the group of radicals:

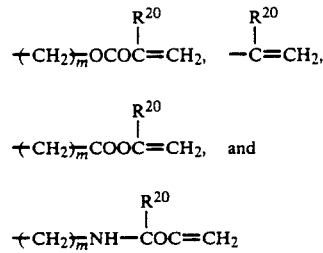

wherein $R^{20}$ is hydrogen or methyl and m is 0 to 3. Preferably, $R^{17}$ is tertiary alkyl having 4 carbon atoms, $R^{18}$ is tertiary alkyl having 4 carbon atoms, $R^{19}$ is:

where m is 3 and $R^{20}$ is methyl.

Additional functionalized monomers which contain an antidegradant moiety and a polymerizable vinyl group are compounds with the structural formula:

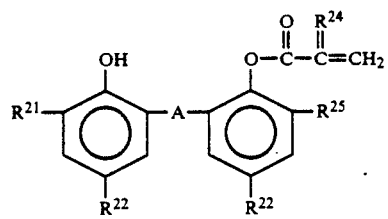

(VI)

wherein $R^{21}$ and $R^{22}$ are selected from n-alkyl radicals having from 1 to 18 carbon atoms and secondary alkyl radicals having from 3 to 18 carbon atoms and t-alkyl radicals having from 4 to 8 carbon atoms; $R^{24}$ is H, $CH_3$ or $C_2H_5$ and A is selected from the radicals:

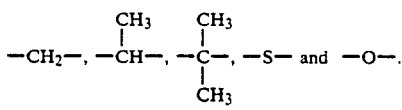

Preferably, $R^{21}$ is tert.alkyl having 4 carbon atoms, $R^{22}$ is an n-alkyl having 1 carbon atom, $R^{24}$ is hydrogen or $CH_3$ and A is $-CH_2-$.

Additional functionalized monomers which contain an antidegradant moiety and a polymerizable vinyl group are compounds with the structural formula:

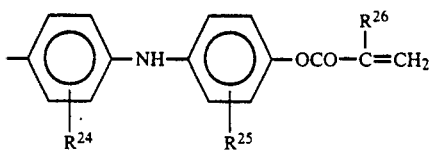

and

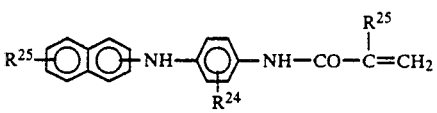

and

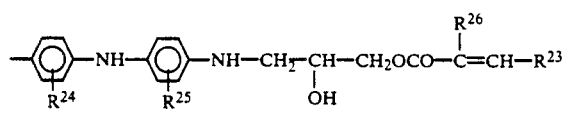

wherein each of $R^{24}$ and $R^{25}$ are alkyl radicals having from 1 to 4 carbon atoms, $R^{26}$ is hydrogen or methyl and $R^{23}$ is hydrogen or phenyl. Preferably, $R^{24}$ is hydrogen, $R^{25}$ is hydrogen, $R^{26}$ is methyl, and $R^{23}$ is hydrogen.

The aforementioned functionalized monomers may be polymerized by well known free radical polymerization techniques with one or more comonomers that are known to polymerize in free radical initiated polymerization systems. The polymerization is carried out in emulsion type systems. Some adjustments in the polymerization recipe and/or reaction conditions may be necessary to obtain a satisfactory rate of polymer formation, depending on the amount of functionalized monomer included and the other monomers involved. These adjustments should be minimal when using the process of the instant invention and would be within the skill of the artisan.

Examples of free radical initiators that are useful in the practice of this invention are those known as "redox" initiators, such as appropriate combinations of chelated iron salts, sodium formaldehyde sulfoxylate and organic hydroperoxides such as cumene and paramenthane hydroperoxides. "Azo" initiators, such as azobisisobutyronitrile are preferred.

Examples of comonomers that are useful in the practice of this invention are conjugated diene monomers such as butadiene-1,3; 2-chlorobutadiene-1,3-isoprene, piperylene, and conjugated hexadienes. In addition, one may, in addition to the conjugated monomers, use a vinyl monomer such as styrene, α-methylstyrene, divinyl benzene, vinyl chloride, vinyl acetate, vinylidene chloride, methyl methacrylate, ethyl acrylate, vinylpyridine, acrylonitrile, methacrylonitrile, methacrylic acid, itaconic acid and acrylic acid. Mixtures of different functionalized monomers and mixtures of different comonomers may be used. The monomer charge ratio by weight is normally from about 0.10/99.9 to 99.9/0.10 functionalized monomer/conjugated diene monomer (including any additional vinyl-monomer). In those instances when one desires to prepare a masterbatch compound, a charge ratio of about 5/95 to about 80/20 is preferred with 10/90 to 40/60 the most preferred. According to one embodiment, the weight ratio of functionalized monomer to conjugated diene monomer to vinyl monomer may range from 5:75:20 to 95:5:0. In those instances where one desires to prepare a rubber compound which is not going to be used as a masterbatch, a charge ratio by weight of about 0.50/99.5 to 5.0/95.0 is preferred with a range of from 1.0/99.0 to 3.0/97.0 being the most preferred. Ratios will vary depending on the amount of rubber chemical functionality desired to be incorporated and on the reactivity ratios of the monomers in the particular polymerization system used.

The present invention has particular utility in preparing masterbatch polymers that have polymer bound antidegradants. To afford adequate protection against degradation, the polymer should contain from about 5 parts to about 70 parts by weight of the segmeric form of the antidegradant per 100 parts by weight of the polymer, although from 10 parts to 50 parts is normally satisfactory, with from 20 parts to 40 parts being preferred. In addition, the ester increases the antidegradant properties of the masterbatch polymer, even though the later moieties are not polymer bound. The remainder of the polymer is comprised preferably of the segmeric form of at least one conjugated diene monomer and optionally the segmeric form of at least one vinyl monomer. Preferably, the polymers contain at least 30 percent by weight of the segmeric form of a conjugated diene with a range of from about 50 to about 90 percent being preferred and a range of from about 60 to 80 percent being particularly preferred. Conventional plasticizers may be used in conjunction with the present invention and user in conventional amounts.

The process of the present invention has significant advantage over the processes of the prior art. For example, the process of the present invention avoids the use of cosolvents such as DCM and THF which may be hazardous. Use of the present invention also avoids the need for solvent recovery (of the organic solvent). The ester functioning as a co-solvent in the masterbatch synthesis will also provide additional antioxidant protection for the final elastomer blend.

EXAMPLE 1

A series of $9.6 \times 10^{-4} m^3$ (thirty-two ounce) bottles were charged with the following per 100 parts by weight of total monomers (functionalized monomer plus conjugated diene monomer plus vinyl monomer). Total monomer charge was 100 grams.

| Ingredient | Parts |
| --- | --- |
| Water | 190.0 |
| Sodium sulfate | 0.2 |
| KOH | 0.3 |
| Na/dodecylbenzene sulfonate | 10.0 |
| Azobisisobutyronitrile | 0.8 |
| Tert-dodecylmercaptan | 0.6 |

Table I sets out the level of the monomers (butadiene, vinylidene chloride and functionalized monomer) and cosolvent (ester) added to the bottles in parts per hundred based on total monomers. The functionalized monomer (AO) was N-(4-anilinophenyl) methacrylamide. The ester was a mixture of 70–85% by weight 3,6,9-trioxaundecane-1,11-bis(3-n-dodecylthio-propionate) and 30–15% 1-(3-n-dodecylthiopropinate)-3,6,9-trioxaundecanol.

TABLE I

| Sample | AO | Butadiene | VC | Ester |
| --- | --- | --- | --- | --- |
| 1 | 25 | 70.0 | 5.0 | 25.0 |
| 2 | 25 | 65.0 | 10.0 | 25.0 |
| 3 | 25 | 60.0 | 15.0 | 25.0 |
| 4 | 25 | 55.0 | 20.0 | 25.0 |

The bottles were tumbled in a water bath at 54° C. for 18 hours to complete conversion. Infrared analysis on extracted samples of coagulated polymer indicated essentially complete incorporation of the antioxidant.

EXAMPLE 2

A $9.6 \times 10^{-4} m^3$ bottle was changed with the following per 100 parts by weight of total monomers (phm).

| Ingredient | phm |
| --- | --- |
| Water | 190.0 |
| Sodium sulfate | 0.2 |
| KOH | 0.3 |
| Rosin acid soap/potassium salt | 11.0 |
| Azobisisobutyronitrile | 0.8 |
| Tert-dodecylmercaptan | 0.6 |

Table II sets out the level of the monomers (butadiene, acrylonitrile (AN) and functionalized monomer). The functionalized monomer (AO) was N-(4-anilinophenyl)methacrylamide. The ester was a mixture of 70–85% by weight 3,6,9-trioxaundecane-1,11-bis(3-n-dodecylthiopropionate) and 30–15% 1-(3-n-dodecylthiopropionate)-3,6,9-trioxaundecanol.

TABLE II

| AO | Butadiene | AN | Ester |
| --- | --- | --- | --- |
| 25.0 | 52.0 | 23.0 | 25.0 |

The bottle was tumbled in a water bath at 54° C. for 18 hours. Infrared analysis on extracted samples of coagulated polymer indicated an essentially complete incorporation of the antioxidant. By independent analysis using colorimetric spectral techniques, 22 parts of bound antioxidant was determined.

EXAMPLE 3

An emulsion was prepared by adding a hot solution (60°–80° C.) of 1.5 phm (parts per hundred monomer) of N-(4-anilinophenyl) methacrylamide and 2.4 phm of an ester mixture of 70–85% by weight 3,6,9-trioxaundecane-1,11-bis(3-n-dodecylthiopropionate) and 30–15% 1-(3-n-dodecylthiopropionate)-3,6,9-trioxaundecanol to an aqueous solution under high shear agitation. The aqueous solution contained 30 phm water, 3.0 phm potassium dodecylbenzene sulfonate, 0.22 phm Tamol ™ SN (sodium salt of condensed naphthalene sulfonic acid) and 0.10 phm tripotassium phosphate. The emulsion was then mixed with a room temperature solution of 0.15 phm tripotassium phosphate in 113 phm water and the pH adjusted to 10.0–10.4. The emulsion was charged into a quart bottle. A solution of 30 phm styrene and 0.4 phm t-dodecylmercaptan was charged, followed by the addition of 0.25 cumene hydroperoxide. 70 phm of butadiene was charged and the bottle capped. An iron activator solution (0.35 phm 3% and 0.10 phm sodium formaldehyde sulfoxylate) was syringed into the bottle. The bottle was rotated in a 18° C. bath and when monomer conversion reach 69% (31% solids), a short stop solution was added (solution of 8.0 phm water, 0.10 phm sodium salt of N,N-diethyldithiocarbamate, 0.05 phm N,N-diethyl hydroxylamine and 0.22 phm potassium pyrophosphate).

The latex was filtered, stripped in a rotary evaporator to concentrate the latex. The final latex solids was 29.0, pH 9.3 and viscosity 295 cps. There was no coagulum or throw out of N-(4-anilinophenyl) methacrylamide in the unstripped latex.

EXAMPLE 4

A $9.6 \times 10^{-4} m^3$ (thirty-two ounce) bottle was charged with 220 parts of water, 0.5 parts trisodium phosphate, 15 parts rosin acid/potassium salt, and 0.5 parts Daxad 11. (Daxad 11 is a sodium salt of polymerized alkyl naphthalene sulfonic acid that is commercially available from W. R. Grace). The pH of the aqueous mixture was 10.0. To the aqueous mixture was charged 40 parts of an ester mixture of 70–85% by weight 3,6,9-trioxaundecane-1,11-bis(3-n-dodecylthiopropionate) and 30–15% 1-(3-n-dodecylthiopropionate)-3,6,9-trioxaundecanol. In addition, 20 parts of N-(4-anilino-phenyl)methacrylamide, 2.5 parts of tert-.dodecyl mercaptan and 0.8 parts azobisisobutyronitrile was added. The bottles were sparged with nitrogen; 80 parts butadiene monomer added and then capped. After the bottles were rotated in a 60° C. bottle polymerization bath for 24 hours, the latex was cooled, filtered and volatiles stripped in a rotary evaporator.

As a control, the above procedure was repeated except instead of the 40 parts of the ester mixture, 40 parts of MIBK was used.

The two masterbatches were latex blended with Plioflex ® 1502 to provide 1.0 phr of bound antidegradant. Plioflex ® 1502 is a styrene-butadiene rubber latex (24% bound styrene) that is commercially available from The Goodyear Tire & Rubber Company. The latices were then coagulated in isopropyl alcohol, dried under vacuum at 45°–55° C. and analyzed thermoxidatively with a temperature program of 2 degrees/min. under a flow of oxygen. The onset temperatures of these blends are shown in Table III below. These temperatures are a measure of thermoxidative stability as an induction period where decomposition starts. Since the oxidation rates are expected to approximately double every several degrees increase in onset temperatures, an 8°–10° C. increase implies a significant improvement in oxidative stability and product lifetime.

TABLE III

| Sample | Cosolvent Used in Prep. | Onset Temp. °C. |
| --- | --- | --- |
| 1 | Control, No MB | 145 |
| 2 | MIBK | 193 |
| 3 | Ester | 220 |

What is claimed is:

1. A process for forming a rubber comprising the aqueous emulsion polymerization of:
   (a) at least one functionalized monomer that contains an antidegradant moiety and a polymerizable vinyl group; with
   (b) at least one copolymerizable conjugated diene monomer selected from the group consisting of butadiene-1,3, 2-chlorobutadiene-1,3, isoprene, piperylene and conjugated hexadienes;
   wherein the polymerization is conducted in the presence of about 1 to about 70 parts by weight of an ester based on 100 parts by weight of total monomers; said ester having the following structural formula:

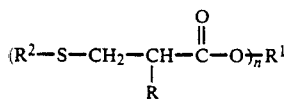
(I)

wherein n is an integer from 1 to 4, wherein R is selected from the group consisting of hydrogen and methyl, wherein when n is 1, $R^1$ is selected from the group consisting of alkyl radicals having from 1 to 18 carbon atoms, aryl radicals having from 6 to 12 carbon atoms, aralkyl radicals having from 7 to 12 carbon atoms and cycloalkyl radicals having from 5 to 12 carbon atoms wherein when n is 2, $R^1$ is selected from the group consisting of alkylene radicals having from 2 to 18 carbon atoms, cycloalkylene radicals having from 5 to 12 carbon atoms, arylene radicals having from 6 to 12 carbon atoms,

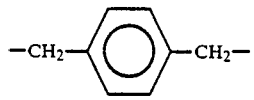

polyalkyl glycol ether radicals having the following structure:

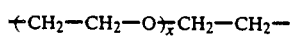

wherein x is an integer from 1 to 7, a thioether radical having the following structure:

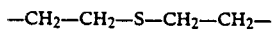

wherein when n is 3 or 4, $R^1$ is an aliphatic hydrocarbon radical having the formula $C_yH_{2y+2-n}$, wherein y is an integer from 3 to 6 and wherein $R^2$ is selected from the group consisting of alkyl radicals having from 1 to 24 carbon atoms, aryl radicals having from 6 to 12 carbon atoms and aralkyl radicals having from 7 to 12 carbon atoms.

2. The process of claim 1 wherein the monomer charge ratio by weight of functionalized monomer to conjugated diene monomer ranges from about 0.10 to 99.9 to 99.9 to 0.10.

3. The process of claim 1 wherein in addition to said functionalized monomer and said copolymerizable conjugated diene monomer, at least one vinyl monomer is polymerized, said vinyl monomer being selected from the group consisting of styrene, α-methylstyrene, divinylbenzene, vinyl chloride, vinyl acetate, vinylidene chloride, methyl methacrylate, ethyl acrylate, vinylpyridine, acrylonitrile, methacrylonitrile, methacrylic acid, itaconic acid and acrylic acid.

4. The process of claim 3 wherein the ratio by weight of functionalized monomer to conjugated diene monomer to vinyl monomer may range from 5:75:20 to 95:5:0 parts per hundred parts based on total monomer.

5. A process according to claim 1 wherein at least one functionalized monomer is from the group consisting of (a) amides having the structural formula:

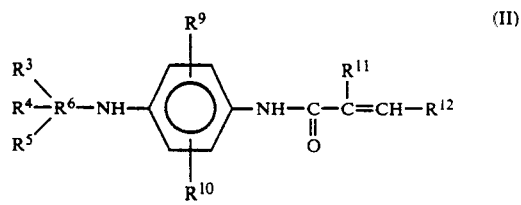
(II)

wherein $R^6$ is an aryl radical, $R^3$ and $R^4$ are selected from the group consisting of hydrogen, alkyl radicals having from 1 to 4 carbon atoms and alkoxy radicals having from 1 to 4 carbon atoms, $R^5$ is selected from the group consisting of hydrogen, alkyl radicals having from 1 to 4 carbon atoms, alkoxy radicals having from 1 to 4 carbon atoms and a radical having the following structural formula:

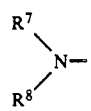

wherein $R^7$ is selected from the group consisting of alkyl radicals having from 1 to 12 carbon atoms, cycloalkyl radicals having from 5 to 12 carbon atoms, aryl radicals having from 6 to 12 carbon atoms and aralkyl radicals having from 7 to 13 carbon atoms and $R^8$ is selected from the group consisting of hydrogen and alkyl radicals having from 1 to 12 carbon atoms and wherein $R^9$ and $R^{10}$ are hydrogen or alkyl radicals having from 1 to 4 carbon atoms, $R^{11}$ is selected from the group consisting of hydrogen, methyl and ethyl: and $R^{12}$ is hydrogen or phenyl: and (b) imides selected from the group consisting of (1) compounds having the following structural formula:

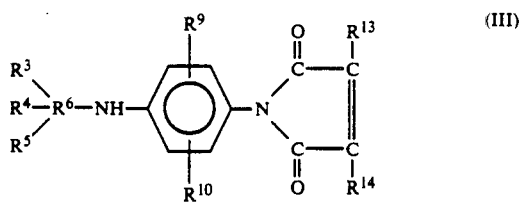
(III)

wherein $R^3$, $R^4$, $R^5$, $R^9$ and $R^{10}$ are as previously defined herein under structural formula II and wherein $R^{13}$ and $R^{14}$ are selected from the group consisting of hydrogen and alkyl radicals having from 1 to 14 carbon atoms and (2) compounds having the following structural formula:

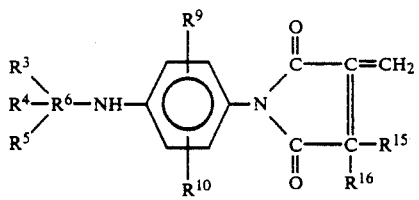

wherein $R^3$, $R^4$, $R^5$, $R^6$, $R^9$ and $R^{10}$ are as previously defined herein under structural formula I and wherein $R^{15}$ and $R^{16}$ are selected from the group consisting of hydrogen and alkyl radicals having from 1 to 4 carbon atoms.

6. A process according to claim 1 wherein the functionalized monomer is selected from the group of compounds represented by the structural formula:

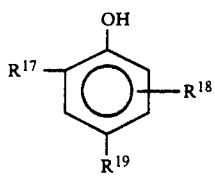

wherein $R^{17}$ and $R^{18}$ is a tert-alkyl radical having from 4 to 8 carbon atoms, $R^{19}$ is selected from the group of radicals:

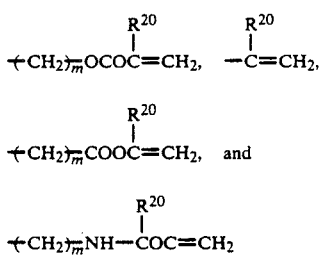

wherein $R^{20}$ is hydrogen or methyl and m is 0 to 3; compounds with the structural formula:

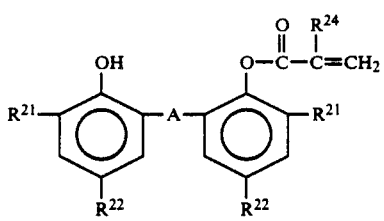

wherein $R^{21}$ and $R^{22}$ are selected from n-alkyl radicals having from 1 to 18 carbon atoms and secondary alkyl radicals having from 3 to 18 carbon atoms and t-alkyl radicals having from 4 to 8 carbon atoms; $R^{24}$ is H, $CH_3$ or $C_2H_5$ and A is selected from the radicals:

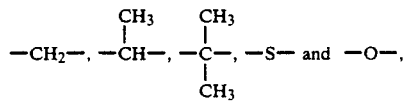

and compounds with the structural formula:

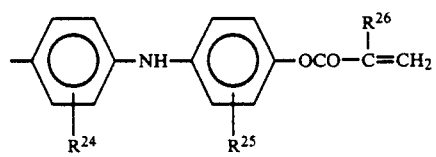

and

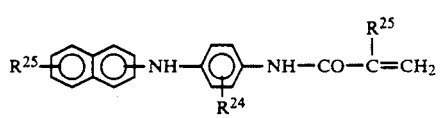

and

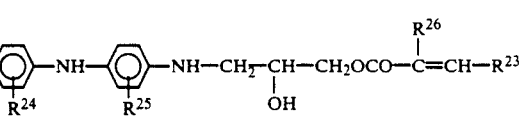

wherein each of $R^{24}$ and $R^{25}$ are alkyl radicals of 1 to 4 carbon atoms, $R^{26}$ is hydrogen or methyl and $R^{23}$ is hydrogen or phenyl.

7. The process of claim 1 wherein said ester is 3,6,9-trioxaundecane-1,11-bis(3-n-dodecylthiopropionate).

8. The process of claim 1 wherein 20 to 50 parts by weight of ester per 100 parts by weight of total monomer is used.

9. The process of claim 1 where 2 to 10 parts by weight of ester per 100 parts by weight of total monomer is used.

10. The process of claim 1 wherein an ionic surfactant is used and is present in an amount ranging from about 2 to 30 parts by weight of ionic surfactant per 100 parts by weight of organic components.

11. The process of claim 9 wherein the amounts of ionic surfactant is present in an amount ranging from about 5 to 12 parts by weight of ionic surfactant per 100 parts by weight of organic components.

12. The process of claim 1 wherein the polymerization is conducted at a temperature ranging from about 0° C. to 25° C.

13. The process of claim 1 wherein the polymerization is conducted at a temperature ranging from about 40° C. to 100° C.

* * * * *

UNITED STATES PATENT AND TRADEMARK OFFICE
CERTIFICATE OF CORRECTION

PATENT NO. : 5,073,592　　　　　　　　　　　　　　PAGE 1 OF 3
DATED : December 17, 1992
INVENTOR(S) : Schulz et al It is certified that error appears in the above-identified patent and that said Letters Patent is hereby corrected as shown below:

At Column 6, lines 1-10, delete:

" 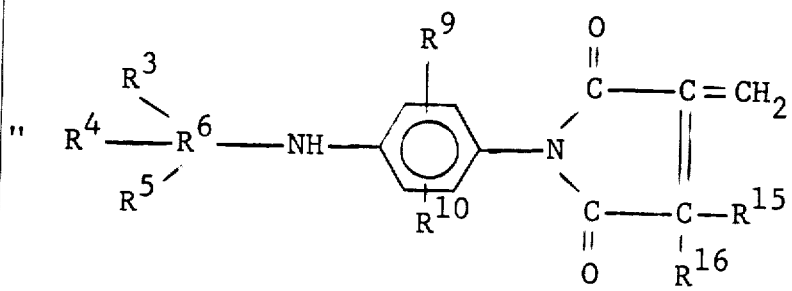 "

and insert therefor:

-- 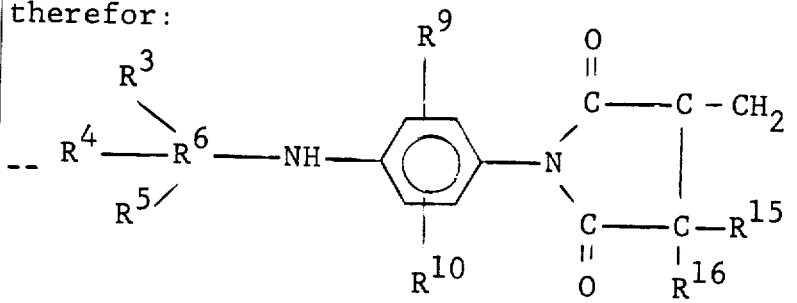 --

UNITED STATES PATENT AND TRADEMARK OFFICE
CERTIFICATE OF CORRECTION

PATENT NO. : 5,073,592
DATED : December 17, 1992
INVENTOR(S) : Schulz et al

It is certified that error appears in the above-identified patent and that said Letters Patent is hereby corrected as shown below:

At Column 6, lines 59-67 delete:

"
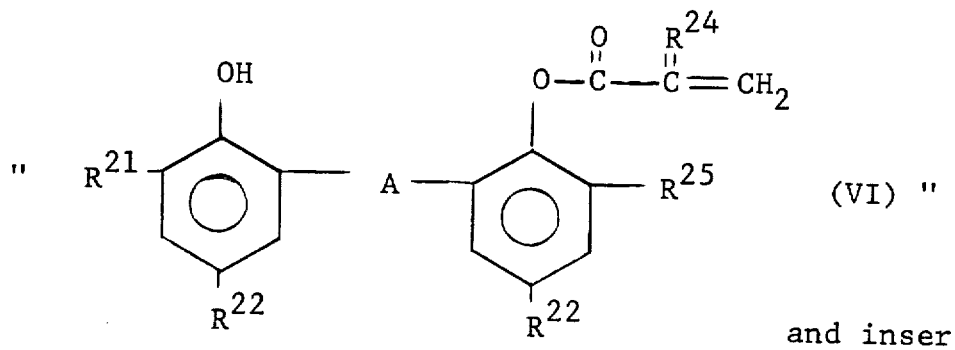
(VI) "

and insert therefor:

--
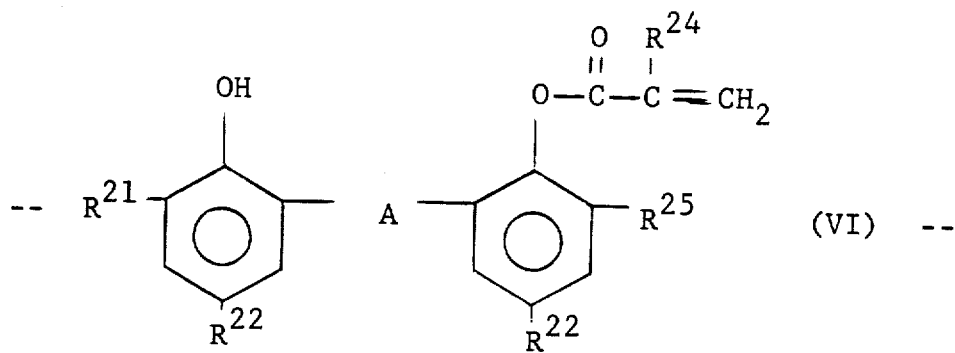
(VI) --

UNITED STATES PATENT AND TRADEMARK OFFICE
CERTIFICATE OF CORRECTION

PATENT NO. : 5,073,592
DATED : December 17, 1992
INVENTOR(S) : Schulz et al

It is certified that error appears in the above-identified patent and that said Letters Patent is hereby corrected as shown below:

At Column 13, lines 4-12 delete:

"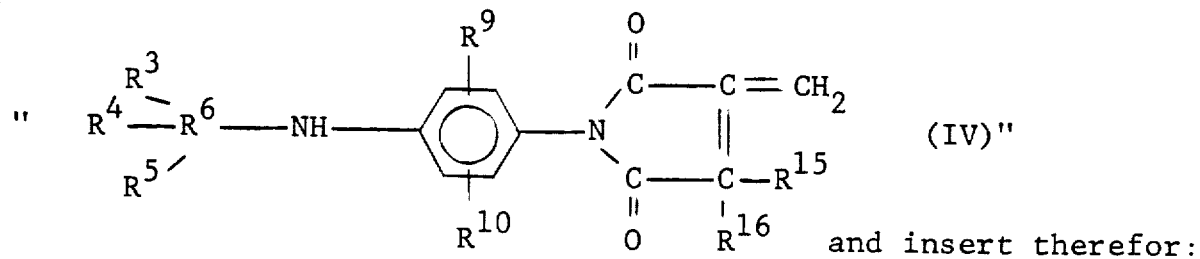 (IV)"

and insert therefor:

--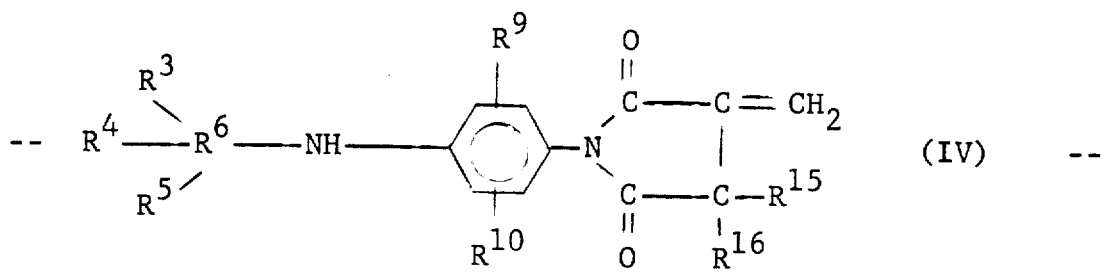 (IV) --

Signed and Sealed this

Fifteenth Day of March, 1994

Attest:

BRUCE LEHMAN

Attesting Officer     Commissioner of Patents and Trademarks